United States Patent [19]

Martinez et al.

[11] Patent Number: 5,254,327
[45] Date of Patent: Oct. 19, 1993

[54] ZEOLITIC CATALYST OF MFI TYPE, ITS PREPARATION AND USE

[75] Inventors: Nelson P. Martinez; Juan A. Lujano, both of Edo Miranda; Nieves Alvarez; Francisco Machado, both of Caracas; Carmen M. Lopez, San Antonio de los Altos, all of Venezuela

[73] Assignee: Intevep, S.A., Caracas, Venezuela

[21] Appl. No.: 863,125

[22] Filed: Apr. 3, 1992

[51] Int. Cl.$^5$ .................... C01B 33/24; B01J 29/28
[52] U.S. Cl. .................... 423/718; 423/700; 502/77
[58] Field of Search .................... 423/700, 718; 502/77

[56] References Cited

U.S. PATENT DOCUMENTS

| | | | |
|---|---|---|---|
| 3,334,964 | 8/1967 | Reid, Jr. | 423/700 |
| 3,702,886 | 11/1972 | Argauer et al. | 423/718 |
| 3,709,979 | 1/1973 | Chu | 423/700 |
| 4,452,907 | 6/1984 | Ball et al. | 423/718 |
| 5,102,644 | 4/1992 | Plank et al. | 423/700 |

Primary Examiner—Carl F. Dees
Attorney, Agent, or Firm—Bachman & LaPointe

[57] ABSTRACT

A zeolitic material with a crystalline structure of MFI type has a ratio of silica to alumina which is lower than 26, and is hydrothermally prepared without organic template reagents or seeding procedures. Crystalline structure is obtained by forming a mixture of a silicon dioxide source, an alkali metal hydroxide, an aluminum source and water, all reactants with the following molar ratios:

$$\frac{SiO_2}{Al_2O_3} \text{ from 14 to 22;}$$

$$\frac{OH^-}{SiO_2} \text{ from 0.05 to 0.08;}$$

$$\frac{M_2O}{SiO_2} \text{ from 0.08 to 0.11;}$$

$$\frac{H_2O}{SiO_2} \text{ from 14 to 22;}$$

where M is an alkali metal, and reacting the mixture at a temperature from 160° to 180° C. for 40–80 hours. The material is characterized by X-ray diffraction, and has good cracking activity and improved selectivity for gasoline octanes.

13 Claims, 1 Drawing Sheet

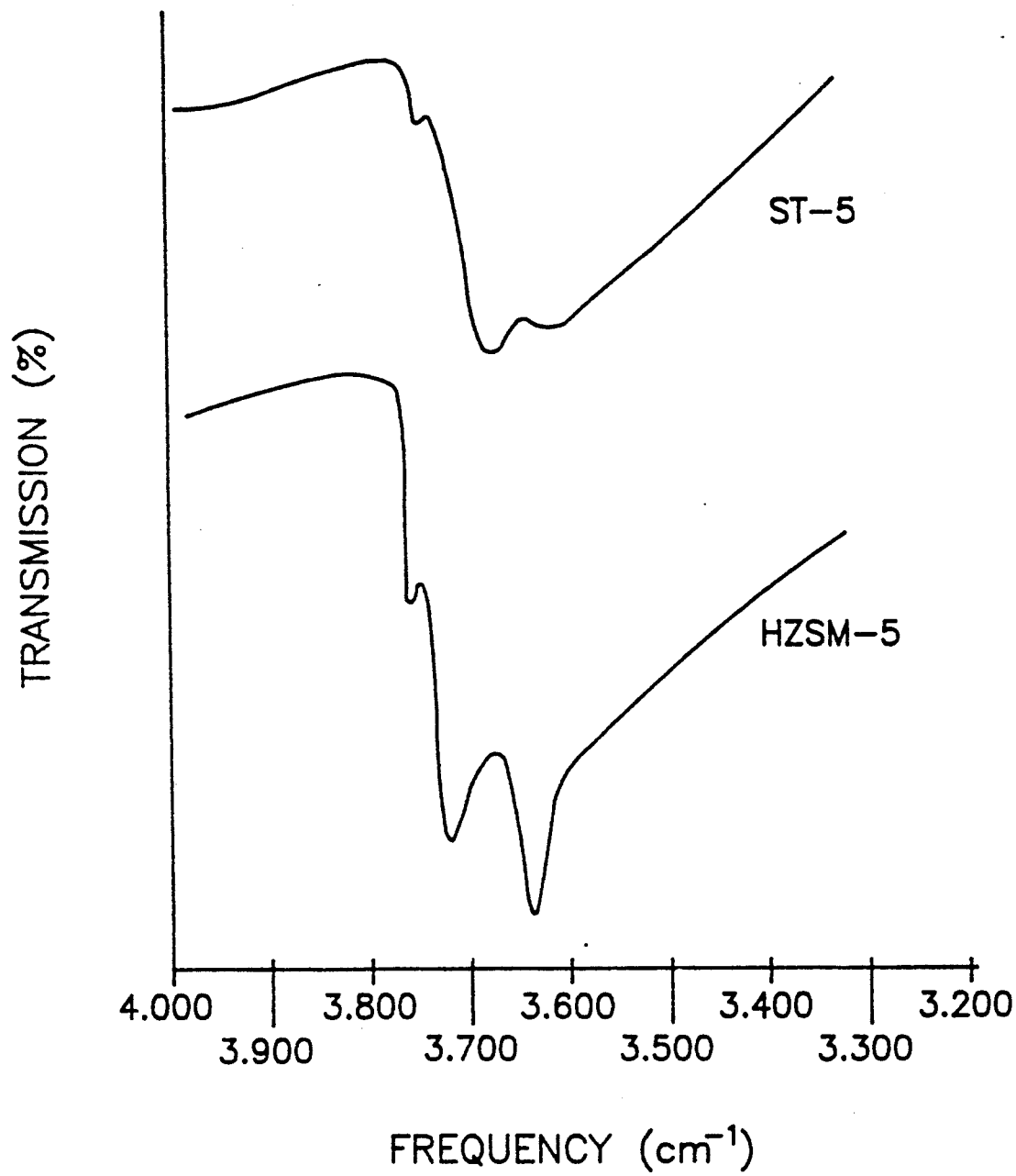

ZEOLITIC CATALYST OF MFI TYPE, ITS PREPARATION AND USE

BACKGROUND OF THE INVENTION

The invention relates to a zeolitic material for fluid catalytic cracking, and methods for its preparation and use and, more particularly, to a zeolitic material having a low ratio of silica to alumina which is prepared without the use of organic templates or seeding and which possesses a better cracking activity and a higher selectivity to gasoline and other light fractions or distillates.

A zeolite is a crystalline aluminosilicate containing zeolitic water, which has an oxide molar composition represented by the following general formula:

$$M_{2/n}O \cdot Al_2O_3 \cdot YSiO_2 \cdot XH_2O$$

wherein M stands for a metal cation, n stands for the valence number of the metal cation M, Y is the molar ratio of $SiO_2$ to $Al_2O_3$ and is generally at least 2, and X is the molar ratio of $H_2O$ to $Al_2O_3$ and is a number larger than 0.

The basic structure of the zeolite comprises $SiO_4$ tetrahedrons having four oxygen atoms at apexes with the silicon atom being at the center, and $AlO_4$ tetrahedrons having four oxygen atoms at apexes with the aluminum atom being at the center, where these $SiO_4$ tetrahedrons and $AlO_4$ tetrahedrons are regularly and three-dimensionally connected to one another while owning oxygen atoms jointly. Since aluminum atoms are trivalent, each $AlO_4$ is negatively charged. This negative charge is balanced by cations $M^{+n}$ to preserve electroneutrality. A three-dimensional network structure having pores differing in size and shape according to the manner of connection of the tetrahedrons can be provided. The thus-formed pores have a size of 2 to 10 angstroms or more, and the pore size can be changed by exchanging the metal cations connected to the $AlO_4$ tetrahedrons with other metal cations having a different size.

Mordenite Framework Inverted (MFI) type zeolites such as ZSM-5 and ZSM-11 are widely used in refinery processes. These zeolites display exceptional catalytic performance in several reactions such as xylene isomerization, benzol alkylation, and the processing of methanol into gasoline and olefins.

Normally, zeolites are prepared using an alkali metal cation and an organic nitrogen containing compound as a specific organic alkyl-amonium ion. Synthesis of known zeolites such as ZSM-5 and ZSM-11 is expensive because this preparation requires large quantities of amines or organic ammonium salts and special reactor material for supporting the corrosive effects of these materials, as well as their disposal. Otherwise for the use of these zeolites as catalysts or absorbent, organic material inside pores and channels of the zeolite must be removed, requiring an additional process to eliminate organics.

It is therefore desirable to prepare zeolites without the use of organic templates or mineralizers.

U.S. Pat. No. 4,257,885 to Grose et al. discloses a zeolite prepared free of organic cations by using a colloidal silica as the silicon source. Nucleating agents or "seeds" are added during the crystallization procedure to produce a product of sufficient purity and in a sufficient yield. The disclosed procedure results in a zeolitic material having a mole ratio of silica to alumina in the range of 10–100.

U.S. Pat. No. 4,562,055 to Arika et al. discloses a process for the preparation of zeolites similar to ZSM-5. The disclosed procedure provides a zeolite similar to ZSM-5 which has a high purity and a high silica to alumina ratio. Preparation of this zeolite, however, requires preparation of a homogeneous phase compound of a granular amorphous aluminosilicate in an aqueous solution of an alkali metal hydroxide and/or an alkali metal silicate.

European Patent No. 94693B1 to Onodera et al. discloses a method for preparation of ZSM-5 zeolite without organic templates. A seeding procedure is used to expedite the formation of the desired crystalline structure.

All of the above-described zeolitic materials have high silica to alumina ratios. It has been discovered, however, that a low silica to alumina ratio is desirable. Such a low ratio provides a high density of active sites and, consequently, a high conversion. This low silica to alumina ratio characteristic results in an improved ion exchange capacity which is ideal for use in a polar adsorbent molecular sieve type material. A low ratio silica to alumina also appears to be helpful in providing a zeolite structure having desirable shape selectivity properties.

The above-described methods for preparation of zeolitic materials also include undesirable steps of seeding, long periods of crystallization or homogeneous starting materials to produce a ZSM-5-like substance.

Accordingly, it is the principle object of the present invention to provide a highly pure zeolite having an $XM_2O \cdot Al_2O_3 \cdot YSiO_2 \cdot ZH_2O$ system, wherein M represents an alkali metal cation, X is the molar ratio of the alkali metal cation to $Al_2O_3$, Y is the molar ratio of $SiO_2$ to $Al_2O_3$, and Z is the molar ratio of $H_2O$ to $Al_2O_3$, and wherein Y is lower than other typical ZSM-5 or ZSM-11 materials.

It is a further object of the present invention to provide a method for preparing a zeolite of MFI type, wherein organic templates, seeding or homogeneous starting solutions are not required.

It is a still further object of the present invention to provide a zeolitic catalyst having good cracking qualities, and an improved selectivity to olefins.

It is still another object of the present invention to provide a zeolitic material which possesses a high ion exchange capacity.

Further objects and advantages of the present invention will appear hereinbelow.

SUMMARY OF THE INVENTION

The invention relates to a zeolitic material for fluid catalytic cracking, and methods for its preparation and use and, more particularly, to a zeolitic material having a low ratio of silica to alumina which is prepared without the use of organic templates or seeding and which possesses a better cracking activity and a higher selectivity to gasoline and other light fractions or distillates.

The zeolitic material, according to the invention, has a composition expressed in terms of mole ratios of oxides as follows:

$$XM_2O \cdot Al_2O_3 \cdot YSiO_2 \cdot ZH_2O$$

wherein M comprises at least one cation selected from Group I of the periodic system of elements, X is the molar ratio of alkali cation oxide to alumina and is between 0.9 to 1.2, Y is the molar ratio of silica to alumina and is between 16 to 26, and Z is the molar ratio of $H_2O$ to alumina and is between 0.4 to 1.5. The zeolitic material is further characterized by its X-ray diffraction pattern, summarized in Table I below, showing diffraction angle, lattice distance (d-spacing) and relative intensity as follows:

TABLE I

| Diffraction angle/2θ | Lattice distance Units (A) | Relative intensity |
|---|---|---|
| 7.93 | 11.15 | 37 |
| 8.81 | 10.03 | 32 |
| 11.89 | 7.44 | 3 |
| 13.19 | 6.71 | 5 |
| 14.81 | 5.98 | 9 |
| 15.57 | 5.69 | 11 |
| 15.85 | 5.59 | 17 |
| 16.57 | 5.35 | 3 |
| 17.76 | 4.99 | 7 |
| 19.30 | 4.60 | 4 |
| 20.40 | 4.35 | 9 |
| 20.79 | 4.27 | 14 |
| 22.05 | 4.03 | 14 |
| 23.12 | 3.84 | 100 |
| 23.74 | 3.75 | 59 |
| 24.30 | 3.66 | 32 |
| 24.71 | 3.60 | 10 |
| 25.70 | 3.46 | 22 |
| 26.32 | 3.38 | 10 |
| 26.85 | 3.32 | 15 |
| 27.31 | 3.26 | 8 |
| 28.36 | 3.15 | 5 |
| 29.19 | 2.99 | 16 |
| 29.97 | 2.98 | 18 |
| 30.86 | 2.90 | 2 |
| 32.69 | 2.73 | 3 |

The method for preparing the above-described zeolitic material comprises the steps of: forming an aqueous solution of an alkali metal aluminate in sodium hydroxide aqueous solution having a molar concentration in a range of 0.7 to 1.3M; mixing the aqueous solution with a colloidal silica to form a gel product having a molar ratio of components as follows:

$\dfrac{SiO_2}{Al_2O_3}$ from 14 to 22;

$\dfrac{OH^-}{SiO_2}$ from 0.05 to 0.08;

$\dfrac{M_2O}{SiO_2}$ from 0.08 to 0.11; and $\dfrac{H_2O}{SiO_2}$ from 14 to 22.

hydrothermally crystallizing the gel product by, for example, heating the gel product to a temperature of 160°–180° C. under autogenous pressure for a period of at least 48 hours; filtering the composition to obtain crystalline aluminosilicate; and drying the aluminosilicate.

The resultant aluminosilicate can then be converted to protonic form through known procedures of ionic exchange.

The above-described method for preparation of a zeolitic material does not require the use of organic templates, seeding procedures or homogeneous starting materials, and provides a zeolitic material having a low silica to alumina ratio which has a good cracking activity, improved selectivity to olefins, and a high ion exchange capacity.

BRIEF DESCRIPTION OF THE DRAWINGS

The accompanying FIGURE is a graph showing comparative IR-spectra of the zeolite of the present invention (ST-5) and a commercial zeolite (HZSM-5).

DETAILED DESCRIPTION

The zeolitic material, according to the present invention, has a composition expressed in terms of mole ratios of oxides as follows:

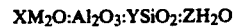

$$XM_2O:Al_2O_3:YSiO_2:ZH_2O$$

In this composition, M comprises at least one cation selected from Group I of the periodic system of elements, and is preferably an alkali metal of Group I. X is the mole ratio of alkali cation to alumina and varies from 0.9 to 1.2. Y is the mole ratio of silica to alumina and is a number selected from a range of 16–26 and is preferably 10. Z is the mole ratio of $H_2O$ to alumina and is a number running from 0.4 to 2.0. This zeolitic material according to the invention is denominated hereinafter as ST-5 or ST-5 zeolite.

The above-described composition can advantageously be used in fluid catalytic cracking (FCC) processes. In such processes, the composition is useful as an additive to a a base catalyst such as Sigma 400 ® from Katalistik (composition set forth in Table VI hereinbelow). The use of the above-described zeolitic material as an additive to such a catalyst results in improved yields of gasoline and other desirable fractions of a standard feedstock. Such a use is set forth below in Example 7.

The zeolitic composition of the subject invention is prepared according to the following procedure.

An aqueous solution is formed of an alkali metal aluminate in sodium hydroxide. The aqueous solution preferably has a molar concentration of alkali hydroxide in the range of 0.7–1.3M, and preferably 0.74–1.2M. This aqueous solution is then mixed with a colloidal silica to form a gel product having a molar ratio of $OH^-$ to $SiO_2$ in the range of 0.05–0.08. As discussed in Example 3 below, this ratio has been found to be critical to obtaining a proper crystalline structure. Ratios lower than 0.05 result in amorphous substances, and ratios higher than 0.08 produce mordenite. This ratio is preferably 0.055–0.065, and ideally is 0.06. The final composition of the gel product is as follows:

$\dfrac{SiO_2}{Al_2O_3}$ in the range from 14 to 22;

$\dfrac{OH}{SiO_2}$ in the range from 0.05 to 0.08;

$\dfrac{M_2O}{SiO_2}$ in the range from 0.08 to 0.11; and $\dfrac{H_2O}{SiO_2}$ in the range from 14 to 22.

The gel is then subjected to hydrothermal crystallization. The hydrothermal crystallization procedure preferably comprises the steps of first heating the gel to a temperature of 160°–180° C., preferably 165°–172° C., under autogenous pressure for a period of at least 48 hours preferably at least 55 hours, and most preferably for a period of 55-94 hours, to obtain the desired hydrothermally crystallized composition. The composition is then filtered to obtain crystalline aluminosilicate. This aluminosilicate is then dried.

For use as an oxide, the resulting aluminosilicate can be converted to protonic form by standard ionic exchange procedures which are known in the art.

When the subject zeolitic material is used as an octane promoter, it has also been found to possess improved resistance to hydrothermal deactivation which takes place during the catalyst regeneration step, as shown more fully in Example 5 below.

Advantages of the present invention will be made clear from a consideration of the following examples.

EXAMPLE 1

The MFI type zeolite of this invention, which will be arbitrarily designated as ST-5, is prepared as follows:

An aqueous aluminate solution was formed by adding 3.6 g of sodium aluminate (45.3% wt. $Al_2O_3$, 29.5% wt. $Na_2O$, 25.6% wt. $H_2O$) to a solution of 0.68 g of NaOH (97.6% wt.) in 20 ml of water. Then this aluminate aqueous solution was added to a dissolution of 50 g of colloidal silica LUDOX AS-40® from Dupont (40% $SiO_2$) in 49 ml of water with continuous stirring in order to set up a gel product. The gel product has the following mole ratios of components:

$$\frac{SiO_2}{Al_2O_3} = 21;$$

$$\frac{H_2O}{SiO_2} = 17;$$

$$\frac{OH^-}{SiO_2} = 0.05;$$

$$\frac{Na_2O}{SiO_2} = 0.08.$$

The gel product was then subjected to hydrothermal crystallization in a 300 ml steel reactor, under autogenous pressure at 165° C. for a period of 66 hours. The obtained product was then separated from the mother liquor, and washed and dried overnight at 120° C. The final powdered material was characterized by the X-ray diffraction pattern set forth previously in Table I. The chemical composition of the ST-5 zeolite as synthesized was determined with atomic absorption analysis as follows:

| Si | 30.0% wt |
| Al | 3.3% wt |
| Na | 2.8% wt |

Chemical analysis yields a Si/Al molar ratio of 8.8, and therefore a silica to alumina ratio of 17.6. The Si/Al molar ratio of 8.8 is a very low ratio for MFI type zeolites (generally having Si/Al ratios ranging between 12-80).

The zeolitic material ST-5 was also subjected to IR and RMN spectroscopy. For the IR-spectroscopy analysis, ST-5 material was converted to protonic form as is set forth in Example II. A KBr tablet was formed by mixing zeolite ST-5 in protonic or acidic form with KBr powder in a proportion of 1:200 (wt/wt). The tablet was then heated and maintained at a temperature of 400° C. under a vacuum pressure of $10^{-5}$ torr for 3 hours. A similar tablet and thermal treatment was performed with a commercial zeolite HZSM-5 from INTERCAT having a silicon to aluminum ratio of 23. The spectra were recorded from a Perkin Elmer Model FTIR-1750 at room temperature. The accompanying FIGURE shows the spectra of the zeolite ST-5 acid compared to the commercial HZSM-5 in the hydroxyl region. The spectra of ST-5 is similar to that of HZSM-5, however, note that two poorly resolved bands between 3.550–3.700 $cm^{-1}$ are observed for the ST-5 material. These bands evidence a high hydroxyl interaction coming from high content of —Al—O—Si—O fragments at zeolite framework with bridge hydroxyls such as —Al—OH—Si—O in interaction with neighboring silanol groups —Si—OH, and thus, the rich aluminum framework for ST-5.

RMN-spectroscopy was run on a synthesized ST-5 as recently made in Example 1, in order to determine the silicon to aluminum ratio in the molecular framework of the zeolite. A RMN-MAS spectrum was run on a Bruker MSL-300 using 59.63 MHz for a $^{29}Si$ nucleus. A sample was placed in a 5 mm zirconium oxide rotor, with a spinning rate between 3–4 Khz. The silicon to aluminum molar ratio found by RMN-spectroscopy is 11.7. This result directly points out the still low silicon to aluminum ratio for ST-5. When compared with the total silicon to aluminum molar ratio found by common chemical analysis to be 8.8, it is apparent that a portion of the aluminum is not inside of the lattice when the zeolite is prepared according to the invention. This aluminum out of the zeolite framework contributes to the improved zeolite activity.

EXAMPLE 2

A sample of the ST-5 zeolite produced according to Example 1 was converted to protonic form by ionic exchange procedures as follows. The ST-5 zeolite sample was treated, or exchanged, twice with a 0.1M $NH_4NO_3$ solution in a relation, liquid to solid, of 18 ml/gr for a period of 4 hours at 50° C. The exchanged zeolite was then washed, filtered and dried at 120° C. for a period of 4 hours. The zeolite was then left at a temperature of 480° C. overnight until all ammonium had decomposed. After calcination, the chemical composition of the ST-5 zeolite in acid form was determined by atomic absorption spectroscopy. The results indicated a composition of:

| Si | 29.0% wt |
| Al | 2.8% wt |
| Na | 0.4% wt |

EXAMPLE 3

This example demonstrates the effects of the mole ratio of $OH^-/SiO_2$ on the structure of the zeolite product. The samples were prepared following procedures similar to that described in Example 1. The $OH^-/SiO_2$ ratio is controlled by changing the NaOH portion while maintaining the amount of $SiO_2$, sodium aluminate and water constant. Five samples were prepared having various ratios, of $OH/SiO_2$, and the resulting zeolites were identified by X-ray diffraction. The structure characteristics which were determined are shown in Table II.

TABLE II

| OH⁻/SiO₂ (mol/mol) | Product |
| --- | --- |
| 1) 0.04 | Amorphous |
| 2) 0.05 | Crystalline MFI like material |
| 3) 0.07 | Crystalline MFI like material |
| 4) 0.08 | MFI like material + Mordenite |
| 5) 0.10 | Mordenite |

As can be observed, the above-described ratio is critical for obtaining the desired crystalline structure of the zeolite product of the present invention.

EXAMPLE 4

This example illustrates the effect of the hydrothermal crystallization temperature on the zeolite product obtained. A gel product was prepared by the procedure set forth in Example 1, having the following molar composition:

$$\frac{SiO_2}{Al_2O_3} = 16;$$

$$\frac{OH^-}{SiO_2} = 0.06;$$

$$\frac{Na_2O}{SiO_2} = 0.09;$$

$$\frac{H_2O}{SiO_2} = 15$$

and crystallization was performed for 48 hours at selected temperatures. The results are shown in table III

TABLE III

| Temperature (°C.) | Product |
| --- | --- |
| 130 | Amorphous |
| 165 | Crystalline MFI like material |
| 200 | Mordenite |

EXAMPLE 5

An example is also provided to demonstrate the n-paraffin cracking capacity of the ST-5 zeolite according to the invention. Several cracking reactions were carried out using a zeolite ST-5 sample prepared according to the procedures of Example 1, and converted to protonic form as in Example 2. Commercial ZSM-5 type octane promoters such as ZCAT® from Intercat, Z100® from Engelhardt and O® from Davison were also tested. Two different feedstocks were run, one being n-hexane the other being n-heptane. The reaction conditions were: t=380° C.; p=1 atm; gas-flow (N₂)=200 cc/min; paraffin flow=0.67 cc/min. Measurements were then taken of the converted fraction, olefin total production (C₃⁼+iso-C₄+C₄⁼), that is, the alkylation potential charge (APC)) and the percentage by weight of coke by-product. These results are summarized in Table IV.

TABLE IV

| | n-HEXANE | | | n-HEPTANE | | |
| --- | --- | --- | --- | --- | --- | --- |
| | CON-VERSION % vol. | APC % vol. | COKE % wt. | CON-VERSION % vol. | APC % vol. | COKE % wt. |
| ZCAT | 46 | 10.48 | 0.33 | 65 | 24.36 | 0.58 |
| Z100 | 17 | 3.09 | 0.03 | 33 | 12.56 | 0.14 |
| "O" | 29 | 14.79 | 0.07 | 65 | 15.21 | 1.00 |
| ST-5 | 45 | 11.22 | 0.08 | 63 | 13.50 | 0.09 |

From Table IV, it is apparent that the catalyst according to the invention has an APC rating similar to the other commercially available analogs for n-heptane cracking, but also possesses a very low coke production tendency, which is a great advantage in catalytic cracking processes. This is an unexpected property of ST-5 material. Also, the ST-5 zeolite does not need an active support for obtaining high cracking activity because of its high acidic strength. This is evident from the high n-hexane conversion values of the ST-5 zeolite. ZCAT® shows a similar conversion capacity of n-hexane, due to its active matrix, but has a tendency for a large production of coke. The other commercial octane promoters (Z100® and O®) show a low tendency for production of coke, but also have poor conversion percentages when used for n-hexane cracking procedures.

EXAMPLE 6

This example demonstrates the effects of hydrothermal deactivation upon octane promoters prepared with the ST-5 zeolite (Si/Al=9.5 mol/mol) as compared with octane promoters prepared using known siliceous zeolites such as HZSM-5 supplied by INTERCAT (Si/Al=23 mol/mol). Hydrothermal deactivation usually occurs during the catalyst regeneration step in a catalytic cracking process.

A sample of the ST-5 zeolite was prepared according to the procedure of Example 1, and converted to protonic form as described in Example 2. This sample was then treated in a fixed bed quartz reactor with an air stream having 10% steam at 680° C. for a period of one hour. A feedstock of n-heptane was then fed into the same reactor at a flow rate of 0.67 cc/min at 300° C. under N₂ flow rate of 200 cc/min. A HZSM-5 zeolite, supplied by INTERCAT, was treated under the same conditions and tested in a similar way. Measurements were then taken as to conversion, APC, and coke production. These results are summarized in Table V.

TABLE V

| Catalyst | CONVERSION (% v) | APC (% v) | COKE (% wt.) |
| --- | --- | --- | --- |
| ST-5 | 13 | 17 | 0.33 |
| HZSM-5 | 6 | 1 | 0.32 |

ST-5 material displays more conversion after steaming and has high yield of valuable APC products. It is apparent that the zeolite material according to the present invention has a relatively high resistance to hydrothermal deactivation when compared to known products such as HZSM-5.

EXAMPLE 7

This example will demonstrate the behavior of ST-5 zeolite when used as an additive in fluid catalytic cracking procedures.

A sample of Sigma 400® from Katalistiks is used as a base catalyst. The composition of this catalyst is given in TABLE VI.

TABLE VI

| Catalyst | Composition | |
|---|---|---|
| Sigma 400 | AL$_2$O$_3$ | 40% wt |
| | SiO$_2$ | 56% wt |
| | Re$_2$O$_3$ | 2% wt |
| | Na$_2$O | 0.4% wt |

This catalyst was hydrothermally deactivated at 760° C., with 100% steam for a period of 5 hours. This was done in order to simulate equilibrium conditions for the catalyst.

Two mechanical mixtures were then prepared. The first mixture included the deactivated catalyst and 2% by weight of commercial HZSM-5 (Si/Al molar ratio of 23). The second mixture consists of the same deactivated catalyst and 2% by weight of ST-5 in acid form, according to the procedure set forth in Example 2. Test procedures according to ASTM D-3907-87, MAT were then carried out. The results are given below in TABLE VII, wherein the column representing the HZSM-5 composition is headed by the label "A" and the column containing results for ST-5 is indicated by the heading "B".

TABLE VI

| Catalyst Additive | (A) HZSM-5 | (B) ST-5 |
|---|---|---|
| H$_2$ % wt | — | — |
| C$_1$ + C$_2$ % wt | 0.70 | 0.55 |
| C$_3$ % vol | 2.32 | 3.40 |
| C$_3$= % vol | 5.34 | 6.75 |
| j C$_4$ | 14.37 | 13.79 |
| n C$_4$ | 2.26 | 4.03 |
| C$_4$= % vol | 4.62 | 5.61 |
| j C$_5$ % vol | 5.69 | 3.78 |
| n C$_5$ % vol | 0.61 | 0.41 |
| C$_6$+ | 0.54 | 0.35 |
| Liquids: | | |
| C$_5$-220° C. % vol | 51.73 | 53.53 |
| 220° C.-343° C. % vol | 13.20 | 13.49 |
| 343 C.+ % vol | 7.92 | 8.52 |
| Conversion % | 78.88 | 77.99 |
| Coke % wt | 9.72 | 8.09 |
| Balance | 98.3 | 99.6 |

As shown in TABLE VI, ST-5 yields a superior amount of C$_5$–220° C. range (gasoline) production. The ST-5 composition also yields an improved amount of gas olefin products (C$_3$, C$_4$).

This invention may be embodied in other forms or carried out in other ways without departing from the spirit or essential characteristics thereof. The present embodiments are therefore to be considered as in all respects to be illustrative and not restrictive, the scope of the invention being indicated by the appended claims, and all changes which come within the meaning and range of equivalency are intended to be embraced therein.

What is claimed is:

1. A MFI zeolitic material prepared from a gel product having a molar ratio of compounds as follows:
   mixing the aqueous solution with a colloidal silica to form a gel product having a molar ratio of compounds as follows:

$$\frac{SiO_2}{Al_2O_3} : 14-22;$$

$$\frac{OH^-}{SiO_2} : 0.055-0.065;$$

$$\frac{Na_2O}{SiO_2} : 0.08-0.11; \text{ and}$$

$$\frac{H_2O}{SiO_2} : 14-22;$$

having a composition expressed in terms of molar ratios of oxides as follows:

ZM$_{2/n}$O:Al$_2$O$_3$:YSiO$_2$:Z H$_2$O wherein M comprises at least one cation selected from Group I of the Periodic System of Elements, wherein X is the molar ratio of alkali cation oxide to alumina and is between 0.9 to 1.2, Y is the molar ratio of silica to alumina and is between 16 to 26, and Z is the molar ratio of water to alumina and is between 0.4 to 2.0, and wherein the zeolitic material is characterized by a d-spacing as follows:

| Diffraction angle/2θ | Lattice distance Units (A) | Relative intensity |
|---|---|---|
| 7.93 | 11.15 | 37 |
| 8.81 | 10.03 | 32 |
| 11.89 | 7.44 | 3 |
| 13.19 | 6.71 | 5 |
| 14.81 | 5.98 | 9 |
| 15.57 | 5.69 | 11 |
| 15.85 | 5.59 | 17 |
| 16.57 | 5.35 | 3 |
| 17.76 | 4.99 | 7 |
| 19.30 | 4.60 | 4 |
| 20.40 | 4.35 | 9 |
| 20.79 | 4.27 | 14 |
| 22.05 | 4.03 | 14 |
| 23.12 | 3.84 | 100 |
| 23.74 | 3.75 | 59 |
| 24.30 | 3.66 | 32 |
| 24.71 | 3.60 | 10 |
| 25.70 | 3.46 | 22 |
| 26.32 | 3.38 | 10 |
| 26.85 | 3.32 | 15 |
| 27.31 | 3.26 | 8 |
| 38.36 | 3.15 | 5 |
| 29.19 | 2.99 | 16 |
| 29.97 | 2.98 | 18 |
| 30.86 | 2.90 | 2 |
| 32.69 | 2.73 | 3. |

2. A zeolitic material according to claim 1, wherein M comprises at least one cation selected from Group I of the Periodic System of Elements.

3. A zeolitic material according to claim 1, wherein Y is less than 20.

4. A method for preparing a zeolitic material, comprising the steps of:
   (1) forming an aqueous solution of an alkali metal aluminate in a basic solution;
   (2) mixing the aqueous solution with a colloidal silica to form a gel product having a molar ratio of compounds as follows:

$$\frac{SiO_2}{Al_2O_3} : 14-22;$$

$$\frac{OH^-}{SiO_2} : 0.005-0.065;$$

$$\frac{Na_2O}{SiO_2} : 0.08-0.11; \text{ and}$$

-continued $$\frac{H_2O}{SiO_2} : 14\text{--}22;$$

(3) hydrothermally crystallizing the gel product;
(4) filtering the gel product to obtain a crystalline aluminosilicate; and
(5) drying the aluminosilicate.

5. A method according to claim 4, wherein the basic solution is a solution of sodium hydroxide in water and the aqueous solution has a molar concentration of alkali metal hydroxide of 0.7 to 1.3M.

6. A method according to claim 5, wherein hydrothermal crystallization is conducted at a temperature of 160°–180° C. under autogenous pressure for at least 48 hours and drying is carried out at a temperature of 80°–120° C.

7. A method according to claim 6, wherein hydrothermal crystallization is conducted at a temperature of 165°–172° C.

8. A method according to claim 6, wherein hydrothermal crystallization is conducted for a period of at least 55 hours.

9. A method according to claim 6, wherein hydrothermal crystallization is conducted for a period of at least 55–94 hours.

10. A method according to claim 4, further comprising the step of:
converting the aluminosilicate to protonic form by ionic exchange.

11. A method according to claim 4, wherein the molar ratio of $OH^-$ to $SiO_2$ in the gel product is 0.06.

12. A MFI zeolitic material prepared from a gel product having a molar ratio of compounds as follows:
mixing the aqueous solution with a colloidal silica to form a gel product having a molar ratio of compounds as follows:

$$\frac{SiO_2}{Al_2O_3} : 14\text{--}22;$$

$$\frac{OH^-}{SiO_2} : 0.050\text{--}0.065;$$

$$\frac{Na_2O}{SiO_2} : 0.08\text{--}0.11; \text{ and}$$

$$\frac{H_2O}{SiO_2} : 14\text{--}22;$$

having a composition expressed in terms of molar ratios of oxides as follows:

$XM_{2/n}O:Al_2O_3:YSiO_2:Z\ H_2O$ wherein M comprises at least one cation selected from Group I of the Periodic System of Elements, wherein X is the molar ratio of alkali cation oxide to alumina and is between 0.90 to 1.2, Y is the molar ratio of silica to alumina and is between 16 to 26, and Z is the molar ratio of water to alumina and is between 0.4 to 2.0, and wherein the zeolitic material is characterized by a d-spacing as follows:

| Diffraction angle/2θ | Lattice distance Units (Å) | Relative intensity |
| --- | --- | --- |
| 7.93 | 11.15 | 37 |
| 8.81 | 10.03 | 32 |
| 11.89 | 7.44 | 3 |
| 13.19 | 6.71 | 5 |
| 14.81 | 5.98 | 9 |
| 15.57 | 5.69 | 11 |
| 15.85 | 5.59 | 17 |
| 16.57 | 5.35 | 3 |
| 17.76 | 4.99 | 7 |
| 19.30 | 4.60 | 4 |
| 20.40 | 4.35 | 9 |
| 20.79 | 4.27 | 14 |
| 22.05 | 4.03 | 14 |
| 23.12 | 3.84 | 100 |
| 23.74 | 3.75 | 59 |
| 24.30 | 3.66 | 32 |
| 24.71 | 3.60 | 10 |
| 25.70 | 3.46 | 22 |
| 26.32 | 3.38 | 10 |
| 26.85 | 3.32 | 15 |
| 27.31 | 3.26 | 8 |
| 38.36 | 3.15 | 5 |
| 29.19 | 2.99 | 16 |
| 29.97 | 2.98 | 18 |
| 30.86 | 2.90 | 2 |
| 32.69 | 2.73 | 3. |

13. A MFI zeolitic material prepared from a gel product having a molar ratio of compounds as follows:
mixing the aqueous solution with a colloidal silica to form a gel product having a molar ratio of compounds as follows:

$$\frac{SiO_2}{Al_2O_3} : 14\text{--}22;$$

$$\frac{OH^-}{SiO_2} : 0.050\text{--}0.065;$$

$$\frac{Na_2O}{SiO_2} : 0.08\text{--}0.11; \text{ and}$$

$$\frac{H_2O}{SiO_2} : 14\text{--}22;$$

having a composition expressed in terms of molar ratios of oxides as follows:

$XM_{2/n}O:Al_2O_3:YSiO_2:Z\ H_2O$ wherein M comprises at least one cation selected from Group I of the Periodic System of Elements, wherein X is the molar ratio of alkali cation oxide to alumina and is between 0.9 to 1.2, Y is the molar ratio of silica to alumina and is between 16 to 26, and Z is the molar ratio of water to alumina and is between 0.4 to 2.0, and wherein the zeolitic material is characterized by a d-spacing as follows:

| Diffraction angle/2θ | Lattice distance Units (Å) | Relative intensity |
| --- | --- | --- |
| 7.93 | 11.15 | 37 |
| 8.81 | 10.03 | 32 |
| 11.89 | 7.44 | 3 |
| 13.19 | 6.71 | 5 |
| 14.81 | 5.98 | 9 |
| 15.57 | 5.69 | 11 |
| 15.85 | 5.59 | 17 |
| 16.57 | 5.35 | 3 |
| 17.76 | 4.99 | 7 |
| 19.30 | 4.60 | 4 |
| 20.40 | 4.35 | 9 |

-continued

| Diffraction angle/2θ | Lattice distance Units (Å) | Relative intensity |
|---|---|---|
| 20.79 | 4.27 | 14 |
| 22.05 | 4.03 | 14 |
| 23.12 | 3.84 | 100 |
| 23.74 | 3.75 | 59 |
| 24.30 | 3.66 | 32 |
| 24.71 | 3.60 | 10 |

-continued

| Diffraction angle/2θ | Lattice distance Units (Å) | Relative intensity |
|---|---|---|
| 25.70 | 3.46 | 22 |
| 26.32 | 3.38 | 10 |
| 26.85 | 3.32 | 15 |
| 27.31 | 3.26 | 8 |
| 38.36 | 3.15 | 5 |
| 29.19 | 2.99 | 16 |
| 29.97 | 2.98 | 18 |
| 30.86 | 2.90 | 2 |
| 32.69 | 2.73 | 3 |

* * * * *

UNITED STATES PATENT AND TRADEMARK OFFICE
CERTIFICATE OF CORRECTION

PATENT NO. : 5,254,327
DATED : October 19, 1993
INVENTOR(S) : NELSON P. MARTINEZ ET AL.

It is certified that error appears in the above-indentified patent and that said Letters Patent is hereby corrected as shown below:

Claim 1, column 10, line 12, the first letter of the equation "Z" should be --X--.

Signed and Sealed this

Seventeenth Day of May, 1994

Attest:

BRUCE LEHMAN

Attesting Officer     Commissioner of Patents and Trademarks